(12) United States Patent
Dette et al.

(10) Patent No.: US 10,118,836 B2
(45) Date of Patent: *Nov. 6, 2018

(54) APPARATUS, USE OF APPARATUS AND PROCESS FOR DESALINATION OF WATER

(71) Applicant: Sulzer Chemtech AG, Winterthur (CH)

(72) Inventors: Severine Dette, Winterthur (CH); Mansour M. M. Ahmad, Al-Jabriya (KW); Manfred Stepanski, Buchs (CH)

(73) Assignee: Sulzer Chemtech AG, Winterthur (CH)

( * ) Notice: Subject to any disclaimer, the term of this patent is extended or adjusted under 35 U.S.C. 154(b) by 623 days.

This patent is subject to a terminal disclaimer.

(21) Appl. No.: 14/419,591

(22) PCT Filed: Feb. 13, 2013

(86) PCT No.: PCT/EP2013/052846
§ 371 (c)(1),
(2) Date: Feb. 4, 2015

(87) PCT Pub. No.: WO2014/023437
PCT Pub. Date: Feb. 13, 2014

(65) Prior Publication Data
US 2015/0210562 A1 Jul. 30, 2015

(30) Foreign Application Priority Data

Aug. 8, 2012 (EP) .................................... 12179662

(51) Int. Cl.
*C02F 1/08* (2006.01)
*C02F 1/22* (2006.01)
(Continued)

(52) U.S. Cl.
CPC .............. *C02F 1/08* (2013.01); *B01D 9/0027* (2013.01); *B01D 9/0059* (2013.01);
(Continued)

(58) Field of Classification Search
CPC .......... B01D 3/145; B01D 1/065; B01D 1/06; B01D 61/02; B01D 61/022; B01D 61/025;
(Continued)

(56) References Cited

U.S. PATENT DOCUMENTS 3,621,664 A 11/1971 Saxer
4,083,781 A 4/1978 Conger
(Continued)

FOREIGN PATENT DOCUMENTS

CN 102285738 A 12/2011
DE 10 2004 058 907 A1 6/2006
(Continued)

OTHER PUBLICATIONS

"Faling Film Crystallization", Jul. 6, 2012 (date obtained from Google search tools), Sulzer, Available online at: http://www.sulzer.com/ar/Products-and-Services/Separation-Technology/Crystallization/Falling-Film-Crystallization.*
(Continued)

*Primary Examiner* — Jonathan Miller
*Assistant Examiner* — Jonathan Luke Pilcher
(74) *Attorney, Agent, or Firm* — Larson & Anderson, LLC

(57) ABSTRACT

A process for desalinating water is disclosed. The process comprises the steps of passing a feed stream of saline solution 2' in a first desalination step through a reverse osmosis membrane desalination plant 3' comprising at least one reverse osmosis desalination unit 4' to form a first product water stream 5' having a reduced salt concentration relative to that of the feed stream of saline solution 2' and a first byproduct stream 6' having an increased salt concentration relative to that of the feed stream of saline solution 2' characterized in that the first byproduct stream 6' is passed (Continued)

in a second desalination step through a falling film crystallization unit 7 to form a second product water stream 8 having a reduced salt concentration relative to that of the first byproduct stream 6' and a second byproduct stream 9 having an increased salt concentration relative to that of the first byproduct stream 6'. The invention further relates to an apparatus 1 for carrying out said process. The present invention further relates also to the use of the process or apparatus 1 for the reduction of the volume of the first byproduct stream 6' of a reverse osmosis membrane desalination plant 3', preferably an in-land desalination plant 3', or in a device or plant or process for producing desalinated water, for salt production, for co-production of power and desalinated water, or for air conditioning.

9 Claims, 7 Drawing Sheets

(51) Int. Cl.
  C02F 1/44 (2006.01)
  B01D 9/00 (2006.01)
  B01D 61/02 (2006.01)
  *B01D 61/08* (2006.01)
  *B01D 61/10* (2006.01)
  *C02F 1/00* (2006.01)
  *C02F 103/08* (2006.01)
  *C02F 103/10* (2006.01)

(52) U.S. Cl.
  CPC .............. B01D 61/025 (2013.01); C02F 1/22 (2013.01); C02F 1/441 (2013.01); *B01D 61/02* (2013.01); *B01D 61/08* (2013.01); *B01D 61/10* (2013.01); *B01D 2311/2673* (2013.01); *C02F 1/008* (2013.01); *C02F 2103/08* (2013.01); *C02F 2103/10* (2013.01); *C02F 2201/002* (2013.01); *C02F 2209/001* (2013.01); *C02F 2209/02* (2013.01); *C02F 2209/05* (2013.01); *C02F 2301/08* (2013.01); *C02F 2303/10* (2013.01); *C02F 2303/20* (2013.01); *C02F 2303/22* (2013.01); *Y02A 20/131* (2018.01); *Y02A 20/132* (2018.01); *Y02W 10/30* (2015.05)

(58) Field of Classification Search
  CPC ...... B01D 61/08; B01D 61/10; B01D 9/0059; C02F 1/22
  See application file for complete search history.

(56) References Cited

U.S. PATENT DOCUMENTS

| | | | |
|---|---|---|---|
| 4,115,274 A | 9/1978 | Boddeker et al. | |
| 4,125,463 A | 11/1978 | Chenoweth | |
| 4,434,057 A | 2/1984 | Marquardt | |
| RE32,241 E | 9/1986 | Saxer | |
| 4,704,877 A * | 11/1987 | Selcukoglu | B01D 9/0013 165/111 |
| 5,695,643 A | 12/1997 | Brandt et al. | |
| 6,030,535 A | 2/2000 | Hayashi et al. | |
| 6,145,340 A | 11/2000 | Stepanski et al. | |
| 9,688,548 B2 * | 6/2017 | Dette | C02F 1/441 |
| 2009/0250409 A1 | 10/2009 | Fiene et al. | |
| 2010/0163471 A1 | 7/2010 | Elyanow et al. | |

FOREIGN PATENT DOCUMENTS

| | | |
|---|---|---|
| EP | 2 070 583 A2 | 6/2009 |
| WO | 2004/013048 A2 | 2/2004 |

OTHER PUBLICATIONS

Cleveland, Cutler J. Morris, Christopher. (2009). Dictionary of Energy (Expanded Edition)—conservation of mass. Elsevier. p. 107. Online version available at: https://app.knovel.com/hotlink/pdf/id:kt007SUB42/dictionary-energy-expanded/conservation-of-mass.*

Geankoplis John Christie, "Transport Processes and Separation Process Principles (Fourth Edition)" Copyright 2003, Jan. 2012, Prentice Hall, pp. 883-892.*

Mullert, M. et al, "Waste Water Reuse by Freeze Concentration with a Falling Film Reactor", Wat. Sci. Tech., Jan. 1, 1992, pp. 1475-1482, No. 7-8, UK, Retrieved from the Internet: URL: http://wst.iwaponline.com/content/26/7-8/1475.full.pdf (Conclusions; p. 6, figure 2).

Flesland, O., "Freeze concentration by layer crystallization", Drying Technology, 1995, pp. 1713-1739, vol. 13, No. 8&9, Norway, Retrieved from the Internet on Aug. 5, 2016 (Abstract, Conclusions p. 1733).

* cited by examiner

APPARATUS, USE OF APPARATUS AND PROCESS FOR DESALINATION OF WATER

BACKGROUND OF THE INVENTION

The present invention relates to a process for desalination of saline solution. The present invention also relates to an apparatus for carrying out this process, and the use of said process or apparatus for the reduction of the volume of concentrated saline solution byproduct of a reverse osmosis membrane desalination plant, or in a device or plant or process for producing desalinated water, for salt production, for co-production of power and desalinated water, or for air conditioning.

In the present application, the term "saline solution" refers to any aqueous solution containing at least one dissolved salt, and the term "first byproduct stream" refers to a concentrated saline solution byproduct obtained from a reverse osmosis (RO) membrane desalination plant. Other examples of concentrated saline solutions include seawater, brackish water, or mining water. It is noted that the saline solution feed stream and the first byproduct stream of a RO membrane desalination plant, as well as the other above examples of concentrated saline solutions, all contain at least one dissolved inorganic salt, typically NaCl.

Fresh water is required for public and domestic water consumption, in farming for irrigation and livestock, and industrially for a variety of processes. In the present application, the term "fresh water" generally refers to water characterized by having low concentrations of dissolved salts and other total dissolved solids and specifically excludes seawater and brackish water. In one embodiment, "fresh water" refers to water containing less than 3,000, preferably less than 1,000, most preferably less than 500 ppm dissolved salts. Drinking water is an example of fresh water. Due to a lack of uniform distribution of fresh water supplies, it is necessary in many regions to obtain fresh water by desalination of a saline solution, for example from the sea. In the present application, the term "first product water stream" refers to the fresh water obtained by the process, apparatus or use of the invention.

Reverse osmosis (RO) is the most widespread technology for desalination of water, and a reverse osmosis desalination apparatus and method are disclosed, for example, in U.S. Pat. No. 4,115,274 or U.S. Pat. No. 4,125,463. It is a membrane separation process in which water is recovered from a saline solution by pressurizing the solution beyond its osmotic pressure and essentially using the membrane to filter out the salt ions from the pressurized solution and allow only the water to pass. The main energy consumption in RO technology results from the pressurization of the saline solution. Relatively low energy consumption with RO technology can be advantageously obtained when the energy losses resulting from releasing the pressure of the concentrated saline solution are minimized by using devices to recover the mechanical compressive energy from the discharged concentrated saline solution stream (first byproduct stream). RO technology is the most widespread commercial technology for desalination due to its favorable economics largely resulting from relatively favorable energy consumption.

Nonetheless RO technology has its disadvantages. Since the pressure required to recover additional fresh water increases as the saline solution or brine stream is concentrated, the water recovery rate of RO systems tends to be low. A related further major disadvantage is then the cost and environmental impact of disposing of the large volume streams of concentrated saline solution byproduct (first byproduct streams) from the RO plant, particularly for inland RO plants. For example, the saline solution byproduct is often discharged to the sea or inland surface water or injected into deep wells. Such practices are not environmentally friendly, and thus they are no longer acceptable. Therefore it would be desirable to have a process and an apparatus for increasing the volume of fresh water recovered, reducing the volume of the first byproduct stream (concentrated saline solution) from RO plants, and without inducing additional harm to the environment.

Thermally-based concentration methods to reduce the volume of first byproduct streams of RO systems are known, such as the flash evaporation method disclosed in U.S. Pat. No. 4,083,781, the forced evaporation method disclosed in U.S. Pat. No. 4,434,057; and the combustion heat evaporation method of U.S. Pat. No. 5,695,643. Such thermally-based concentration methods have the disadvantage of being energy intensive and thus costly. In addition, they are susceptible to scale formation and its associated thermal and mechanical problems. Alternatively, first byproduct streams may be concentrated by solar ponds having low energy costs, but this thermal method requires large amounts of land and direct sunlight and suffers from low productivity and expensive and time consuming maintenance. Furthermore solar thermal methods are not applicable to all regions and/or climates in that the presence of dust may block sunlight and/or surface area for evaporation, thereby increasing the time required for evaporation. In addition, the evaporated water is lost to the environment in the case of a pond, and it is not available then as a supply of drinking water. Finally toxic compounds such as sulfur-based compounds may evaporate and be transferred to the environment resulting in EHS issues.

Electrodialysis methods are also known for treating the first byproduct streams of RO systems. For example, an integrated RO and electrodialysis system is known from EP 2 070 583 A2, and the method of U.S. Pat. No. 6,030,535 uses a combination of an electrodialysis unit and evaporator to treat the concentrated saline solution byproduct stream from an RO system. Electrodialysis methods suffer the disadvantage though of being sensitive to membrane fouling and scaling, and they also require large quantities of direct current and their electric fields are only capable of removing ionic components. In conclusion, it would be desirable to have a process and apparatus to reduce the volume of concentrated saline solution byproduct streams of RO systems that has reduced energy requirements without requiring large infrastructures and without being susceptible to membrane fouling and having reduced susceptibility to scaling.

SUMMARY OF THE INVENTION

Starting from this state of the art, it is an object of the invention to provide a process for reducing the volume of first byproduct streams from RO plants. Further objects of the invention include providing an apparatus suitable for use in said process, and the use of said process or apparatus for the reduction of the volume of the first byproduct stream of a reverse osmosis membrane desalination plant, or in a device or plant or process for producing desalinated water, for salt production, for co-production of power and desalinated water, or for air conditioning.

According to the invention, these objects are achieved by a process for desalinating water, said process comprising the steps of: (i) passing a feed stream of saline solution in a first desalination step through a reverse osmosis membrane desalination plant comprising at least one reverse osmosis desalination unit to form a first product water stream having a reduced salt concentration relative to that of the feed stream of saline solution and a first byproduct stream having an increased salt concentration relative to that of the feed stream of saline solution, wherein (ii) the first byproduct stream is passed in a second desalination step through a falling film crystallization unit to form a second product water stream having a reduced salt concentration relative to that of the first byproduct stream and a second byproduct stream having an increased salt concentration relative to that of the first byproduct stream. Through the layer crystallization process all ions in solution will be concentrated.

According to the invention, these further objects are achieved firstly by an apparatus comprising: a reverse osmosis (RO) membrane desalination plant comprising at least one reverse osmosis desalination unit having an inlet for a feed stream of saline solution, an outlet for a first product water stream, an outlet for a first byproduct stream, wherein the outlet for the first byproduct stream is in fluid connection with an inlet of a falling film crystallization unit having an outlet for a second product water stream, and an outlet for a second byproduct stream. Said apparatus is used in accordance with the invention for the reduction of the volume of the first byproduct stream of a reverse osmosis membrane desalination plant, preferably an in-land desalination plant, or in a device or plant or process for producing desalinated water, for salt production, for co-production of power and desalinated water, or for air conditioning.

The present invention achieves these objects and provides a solution to this problem by means of passing the first byproduct stream in a second desalination step through a falling film crystallization unit to form a second product water stream having a reduced salt concentration relative to that of the first byproduct stream and a second byproduct stream having an increased salt concentration relative to that of the first byproduct stream. As a result, the first byproduct stream of an RO membrane desalination plant having a relatively high salt concentration is readily concentrated further by the falling film crystallization to give a reduced volume of high salinity solution (waste concentrated brine) as the second byproduct stream and a second product water stream having a reduced salt concentration and thus suitable for recycling or other applications. Therefore the overall waste volume is significantly reduced. Alternatively the second product water stream may be advantageously fed to the feed stream of saline solution to the RO membrane desalination plant in order to reduce its hardness and thus the risk of scale formation. The further concentration of the first byproduct stream from the RO membrane desalination plant by the method of the present invention allows then the ready reduction in the volume of first byproduct streams and an improvement in the productivity of the overall desalination process. For example, the use of the present invention allows a reduction in the volume of the first byproduct streams by over 80%, and the remaining small volume of highly concentrated saline solution waste (second or third byproduct streams) may then be readily treated by conventional means such as evaporation.

These results are then surprisingly achieved without the need for high energy consumptions or large infrastructures and with reduced risks of scaling.

In a preferred embodiment, the process comprises the additional step, wherein the second byproduct stream of the falling film crystallization unit is passed in a third desalination step through either a static crystallization unit or through the same or a second falling film crystallization unit to form a third product water stream having a reduced salt concentration relative to that of the second byproduct stream and a third byproduct stream having an increased salt concentration relative to that of the second byproduct stream. This additional step further reduces the volume of the first byproduct stream and increases the productivity of the process, and the third product water stream may be advantageously recycled by feeding it into the first byproduct stream in a particularly preferred embodiment. If the falling film crystallization unit has sufficient capacity, it will often be preferred to carry out the third desalination step in the same unit so as to minimize investment costs.

Likewise a preferred embodiment of the apparatus additionally comprises a static crystallization unit or a second falling film crystallization unit having an inlet in fluid communication with the outlet for the second byproduct stream of the falling film crystallization unit and outlets for a third product water stream and a third byproduct stream, in order to achieve the previously discussed benefits of the associated process embodiment. In a preferred alternative embodiment, the first falling film crystallization unit is equipped with the appropriate buffer vessel(s) and fluid connections so that a third desalination step may be carried out in it. Similarly the outlet for a third product water stream may advantageously be in fluid communication with the first byproduct stream.

According to another preferred embodiment of the process, the salt concentration of the first byproduct stream is between about 3 to about 7 weight %, preferably between about 4 to about 7, more preferably between about 5 to about 7, most preferably between about 6 to about 7. Feeding the falling film crystallization unit with a stream having such salt concentrations ensure that the unit produces a second product water stream of sufficiently good quality, i.e. to be used as drinking water or for industrial applications such as cooling, while simultaneously minimizing the relative volume of the second byproduct stream (concentrated brine waste).

In yet another preferred embodiment of the process, the first byproduct stream is crystallized in the falling film crystallization unit at a temperature between about −1 to about −4° C., preferably about −1.5 to about −4, more preferably about −2 to about −4, most preferably about −3 to about −4. In still yet another preferred embodiment of the process having a third desalination step, the second byproduct stream is crystallized at a temperature between about −4 to about −13, preferably about −6 to about −10, most preferably about −9 to about −10. Reducing the crystallization temperature increases the relative volume of the second or third product water stream. On the other hand, too low a temperature becomes counterproductive in that the quality of the second product water stream deteriorates as the separation performance of the falling film crystallization unit decreases. Nonetheless the quality of the second product water stream remains good enough that it may be recycled as a feed stream of saline solution into a RO membrane desalination plant or used for a third desalination step. Alternatively the third product water stream may be fed back into the first byproduct stream and thus desalinated in the falling film crystallization unit. However at lower temperatures there is a greater risk of forming salt crystals and carbonate and sulphate precipitates. Therefore it has surprisingly been found that the previously-mentioned temperature ranges offer the best compromise between these various competing factors in yielding the preferred operating temperatures.

In yet another preferred embodiment of the process, the salt concentration of the second byproduct stream is between about 8 to about 18 weight %, preferably between about 10 to about 15, more preferably between about 14 to about 15. Maintaining a salt concentration in these ranges allows the process to operate with an optimum level of water recovery.

In still yet another preferred embodiment of the process, the second desalination step in the falling film crystallization unit and/or the third desalination step in the static crystallization unit or in the same or a second falling film crystallization unit comprises a sweating stage in which a byproduct is removed from a product by means of partial melting of a crystal within the falling film crystallization unit and/or the static crystallization unit or the same or second falling film crystallization unit. A sweating stage has the benefit of removing significant amounts of impurities and thus considerably increasing the purity of the product stream.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one method claim may be combined with the subject matter of one or more other method claims or the subject matter of one or more apparatus claims or the subject matter of a mixture of one or more method claims and apparatus claims. By analogy, the subject matter of any one apparatus claim may be combined with the subject matter of one or more other apparatus claims or the subject matter of one or more method claims or the subject matter of a mixture of one or more method claims and apparatus claims. By way of example, the subject matter of claim 1 may be combined with the subject matter of any one of claims 9 to 12. In one embodiment, the subject matter of claim 9 is combined with the subject matter of any one of claims 1 to 8. In one specific embodiment, the subject matter of claim 9 is combined with the subject matter of claim 2. In another specific embodiment, the subject matter of claim 3 is combined with the subject matter of claim 10. By way of another example, the subject matter of claim 1 may also be combined with the subject matter of any two of claims 2 to 12. In one specific embodiment, the subject matter of claim 1 is combined with the subject matter of claims 2 and 9. In another specific embodiment, the subject matter of claim 8 is combined with the subject matters of claims 1 and 4. By way of example, the subject matter of claim 1 may be combined with the subject matter of any three of claims 2 to 12. In one specific embodiment, the subject matter of claim 1 is combined with the subject matters of claims 2, 9 and 11. In another specific embodiment, the subject matter of claim 9 is combined with the subject matters of claims 2, 6, and 10. In yet another specific embodiment, the subject matter of claim 1 is combined with the subject matters of claims 2 to 7. By way of example, the subject matter of any one claim may be combined with the subject matters of any number of the other claims without limitation to the extent that such combinations are technically feasible.

One skilled in the art will understand that the combination of the subject matters of the various embodiments of the invention is also possible without limitation in the invention. For example, the subject matter of one of the above-mentioned preferred embodiments may be combined with the subject matter of one or more of the other above-mentioned preferred embodiments without limitation. By way of example, according to a particularly preferred embodiment of the process, the salt concentration of the first byproduct stream is between about 3 to about 7 weight %, preferably between about 4 to about 7, more preferably between about 5 to about 7, most preferably between about 6 to about 7 and the salt concentration of the second byproduct stream is between about 8 to about 18 weight %, preferably between about 10 to about 15, more preferably between about 14 to about 15. By way of another example, according to another particularly preferred embodiment, the process comprises the additional steps wherein the second byproduct stream is passed in a third desalination step through a second falling film crystallization. By way of yet another example, according to another particularly preferred embodiment, the apparatus comprises a second falling film crystallization unit and where the outlet of the second falling film crystallization unit for a third product water stream is in fluid communication with the first byproduct stream. By way of still yet another example, the second desalination step and the third desalination both comprise a sweating stage in which a byproduct is removed from a product by means of partial melting of a crystal within the crystallization unit.

BRIEF DESCRIPTION OF THE DRAWINGS

The invention will be explained in more detail hereinafter with reference to various embodiments of the invention as well as to the drawings. A single quotation mark (') after a reference number is used to indicate those features of the prior art. The schematic drawings show.

DETAILED DESCRIPTION OF THE INVENTION

Figure 1:
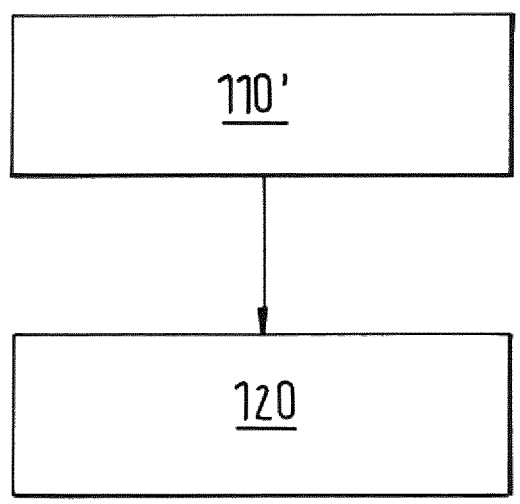
FIG. 1 shows a schematic view of an embodiment of the process for desalinating water according to the invention having a first and second desalination step.

FIG. 1 shows a schematic view of a process according to the invention which as a whole is labeled with reference number 100. The process 100 comprises a first desalination step, which is labeled as 110'; and a second desalination step, which is labeled as 120. In the first desalination step 110', a feed stream of saline solution 2' is passed through a reverse osmosis membrane desalination plant 3', wherein the plant 3' comprises at least one reverse osmosis desalination unit 4', to form a first product water stream 5' having a reduced salt concentration relative to that of the feed stream of saline solution 2' and a first byproduct stream 6' having an increased salt concentration relative to that of the feed stream of saline solution 2'. In the second desalination step 120 the first byproduct stream 6' is passed through a falling film crystallization unit 7 to form a second product water stream 8 having a reduced salt concentration relative to that of the first byproduct stream 6' and a second byproduct stream 9 having an increased salt concentration relative to that of the first byproduct stream 6'.

As shown in FIG. 1, as well as in FIGS. 2-6, the first byproduct stream 6' from the reverse osmosis desalination unit 4' is fed directly to the falling film crystallization unit 7 without passing through any intermediate concentrator or evaporator devices, such as a mechanical vapor compression unit or a thermal or a steam driven evaporator. Therefore the salt concentration of the first byproduct stream 6' remains relatively unchanged after it exits the reverse osmosis desalination unit 4' until it is fed directly to the falling film crystallization unit 7, as shown in these figures. The lack of such intermediate concentrator or evaporator devices has benefits in minimizing the complexity, investment and maintenance costs, and footprint of the apparatus and process for desalinating water.

In the specification and claims of this application, the salt concentration of saline solution is expressed as a weight % (weight salt/weight saline solution×100%). There are several well-known methods in the art to measure the salt concentrations of water, and they include Total Dissolved Solids (TDS) usually together with a mass salt balance, gravimetric determination of weight left upon evaporation of the water, melting point (or freezing point) determination, optical refractometry, UV/Vis spectrophotometry to detect the major components of ionic components in solution (e.g. using a HACH LANGE DR 5000 UV-Vis Spectrometer), full chemical analysis taking into account the charge balance for ions, and electrical conductivity measurements.

Electrical conductivity measurements are based on the measurement of the amount of electrical current conducted across a centimeter length of water column of unit cross-sectional area. Water containing a higher amount of dissolved salts has a higher conductivity. As used herein, the salt concentration in weight % is obtained by dividing the salt concentration in parts per million by 10000. The salt concentration (C) in units of parts per million (ppm) as used herein is determined by an electrical conductivity measurement, where the electrical conductivity (U) is expressed in units of milli-siemens per cm (mS/cm). The relationship between C in ppm and U in mS/cm is provided by the following equation:

$$C=((0.0154009*(U^3))-(2.67657*(U^2))+(922.071*(U))-(744.133))$$

Figure 2:
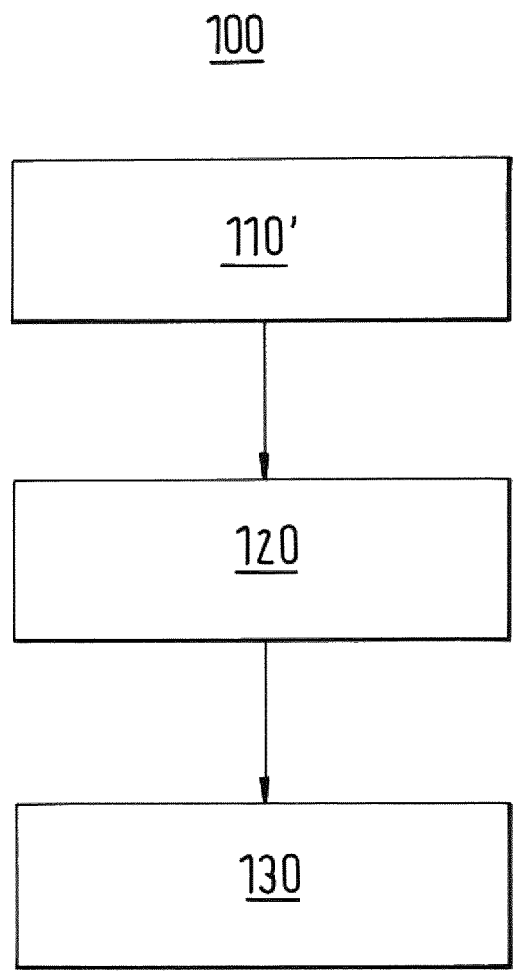
FIG. 2 shows a schematic view of a preferred embodiment of a process for desalinating water according to the invention, in which a third desalination step takes place in a static crystallization unit.

FIG. 2 shows a schematic view of a preferred embodiment of the invention which is a process 100 comprising a first desalination step 110', a second desalination step 120, and a third desalination step, which takes place in a static crystallization unit 10, which is labeled as 130. In the third desalination step 130, a third product water stream 12 having a reduced salt concentration relative to that of the second byproduct stream 9 and a third byproduct stream 13 having an increased salt concentration relative to that of the second byproduct stream 9 are formed. As discussed earlier, this additional step beneficially reduces the volume of the first byproduct stream 6' and increases the productivity, and the third product water stream 12 may be advantageously recycled in one embodiment by feeding it into the first byproduct stream 6'.

Figure 3:
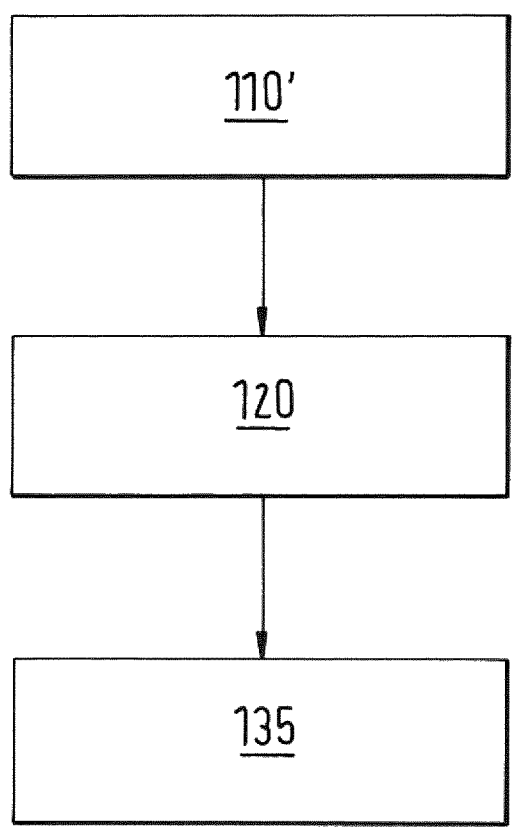
FIG. 3 shows a schematic view of a preferred embodiment of a process for desalinating water according to the invention, in which a third desalination step takes place in the same or a second falling film crystallization unit.

FIG. 3 shows a schematic view of a preferred embodiment of the invention which is a process 100 comprising a first desalination step 110', a second desalination step 120, and a third desalination step, which takes place in the same 7 or a second falling film crystallization unit 11, which is labeled as 135. In the third desalination step 135, a third product water stream 12 having a reduced salt concentration relative to that of the second byproduct stream 9 and a third byproduct stream 13 having an increased salt concentration relative to that of the second byproduct stream 9 are formed. This preferred embodiment has similar advantages to that of the one shown in FIG. 2, and the third product water stream 12 may be advantageously recycled in one embodiment by feeding it into the first byproduct stream 6'.

The first desalination step 110' and its feed stream of saline solution 2', reverse osmosis membrane desalination plant 3', reverse osmosis desalination unit 4', first product water stream 5', and first byproduct stream 6' are all conventional and well-known in the art, for example, as disclosed in U.S. Pat. No. 4,125,463.

Preferred process conditions for the second desalination step 120 are the same for the process of the invention as shown in FIG. 1 and its preferred embodiments shown in FIG. 2 and FIG. 3 unless otherwise specifically indicated. Falling film crystallization units 7 and their operation are well-known in the art, for example, as disclosed in U.S. Re. 32,241 or U.S. Pat. No. 3,621,664. Unless indicated otherwise, conventional falling film crystallization units 7 and 11 may be used and operated as known in the art for the second desalination step 120 and third desalination step 130. Static crystallization units 10 and their operation are well-known in the art, for example, as disclosed in Sulzer Technical Review February 1999 pp. 8-11, Sulzer Technical Review January 2006 pp. 4-6, or U.S. Pat. No. 6,145,340. Unless indicated otherwise, a conventional static crystallization unit 10 may be used and operated as known in the art for the third desalination step 130.

In principle, freezing-desalination technology has many advantages over other conventional desalination processes for treating highly concentrated saline solutions, especially its lower energy requirement and reduced scaling, fouling, and corrosion problems. Due to the low operating temperatures of freezing-desalination technology, no special materials of construction (e.g. corrosion resistant) are required.

In preferred embodiments of the apparatus 1, the various crystallization units 7 and/or 10 and/or 11 are equipped with appropriate buffer vessel(s) and fluid connections so that additional further desalination steps may be carried out within the same unit.

The various product and byproduct streams from the crystallization units may be conveniently controlled by means of the mass balance in collecting vessels directly connected to the crystallization unit. The heating and cooling requirements of the crystallization units are varying as a function of time, and energy buffer systems may be advantageously used in order to minimize the fluctuations in the demands for steam and refrigeration. In the case of a batch operation, streams may be stored in buffer vessels prior to their passing through a specific crystallization unit. The crystallization units may be conveniently controlled by a computer system using level and temperature measurement instruments, as well as on/off or control valves.

Additional information on crystallizers and their operation is disclosed in Handbook of Industrial Crystallization, $2^{nd}$ Edition, by Allan S. Myerson, published Jan. 9, 2002 by Butterworth-Heinemann, Woburn, Mass. ISBN: 978-0750670128 and Crystallization Technology Handbook, $2^{nd}$ Edition, edited by A. Mersmann, published 2001 by Marcel Dekker, Basel, ISBN: 0-8247-0528-9.

In one embodiment, the salt concentration of the first byproduct stream 6' is between about 3 to about 7 weight %, preferably between about 4 to about 7, more preferably between about 5 to about 7, most preferably between about 6 to about 7. As discussed earlier, feeding the falling film crystallization unit 7 with a stream 6' having such salt concentrations ensures that the unit 7 produces a second product water stream 8 of sufficiently good quality, while simultaneously minimizing the volume of the first byproduct stream 6'.

In another embodiment, the first byproduct stream 6' is crystallized in the falling film crystallization unit 7 at a temperature between about −1 to about −4° C., preferably about −1.5 to about −4, more preferably about −2 to about −4, most preferably about −3 to about −4. As discussed earlier, such temperature ranges offer a process optimum in terms of the quality and volume of the second product water stream 8.

The temperature of the crystallization in a specific crystallization unit as referred to in the specification of this application is expressed in degrees Celsius (° C.), and it is measured by measuring the melting point of the product water stream removed from the specific crystallization unit.

In yet another embodiment of the process of the invention having a third desalination step 130 or 135, the second byproduct stream 9 is crystallized in the static crystallization unit 10 or the same 7 or a second falling film crystallization unit 11 at a temperature between about −4 to about −13° C., preferably about −6 to about −10, more preferably about −9 to about −10.

In still yet another embodiment, the salt concentration of the second byproduct stream 9 is between about 8 to about 18 weight %, preferably between about 10 to about 15, more preferably between about 14 to about 15. As discussed earlier, these ranges act to optimize the water recovery of the process.

It will be understood by one skilled in the art that the use of very low crystallization temperatures in order to achieve even higher salt concentrations of the byproduct stream will be limited in practice to a maximum salt concentration of about 23 weight % due to the eutectic point of saline solution.

In embodiments of the process of the invention in which a second desalination step 120 takes place in a falling film crystallization unit 7 or in which a third desalination step 135 takes place in a static crystallization unit 10, for example, such as that shown in FIG. 2, or a second falling film crystallization unit 11, for example, such as that shown in FIG. 3, in some specific further embodiments the second desalination step 110 and/or the third desalination step 130 or 135 comprises a sweating stage in which a byproduct 18 is removed from a product 19 by means of partial melting of a crystal 20 within the falling film crystallization unit 7 or the static crystallization unit 10 or the second falling film crystallization unit 11.

A sweating stage is a temperature-induced purification based on a partial melting of crystals or crystal layers by heating the cooled surface to a temperature close to the melting point of the pure substance (water). As a result, impurities or inclusions are in near equilibrium with the solid phase. An increase in temperature will cause material in the adjacent solid phase to dissolve into such inclusions until phase equilibrium is re-established. The primary result of this phenomenon is to increase the porosity of the layer, which allows inclusions to drain out. A secondary effect is a reduction in viscosity, which also assists the draining process. As discussed earlier, these specific further embodiments have benefits in significantly improving the purity of the product stream obtained and with only a relatively small loss of water.

Figure 4:
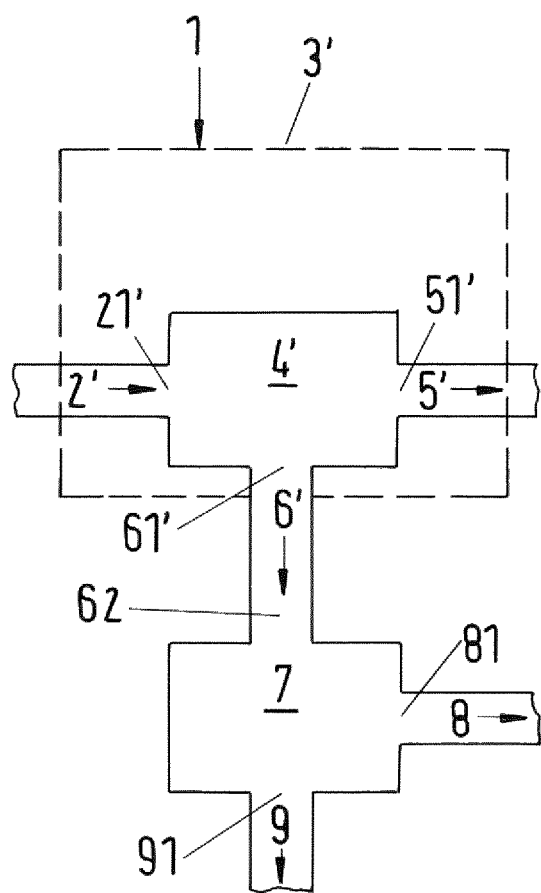
FIG. 4 shows a schematic view of an embodiment of an apparatus according to the invention for carrying out a process for desalinating water according to the invention having a first and second desalination step.

FIG. 4 shows a schematic view of an apparatus according to the invention which as a whole is labeled with reference number 1. The apparatus 1 comprises a reverse osmosis membrane desalination plant 3' comprising at least one reverse osmosis desalination unit 4' having an inlet 21' for a feed stream of saline solution 2', an outlet 51' for a first product water stream 5', an outlet 61' for a first byproduct stream 6', wherein the outlet 61' is in fluid connection with an inlet 62 of a falling film crystallization unit 7 having an outlet 81 for a second product water stream 8, and an outlet 91 for a second byproduct stream 9.

Figure 5:
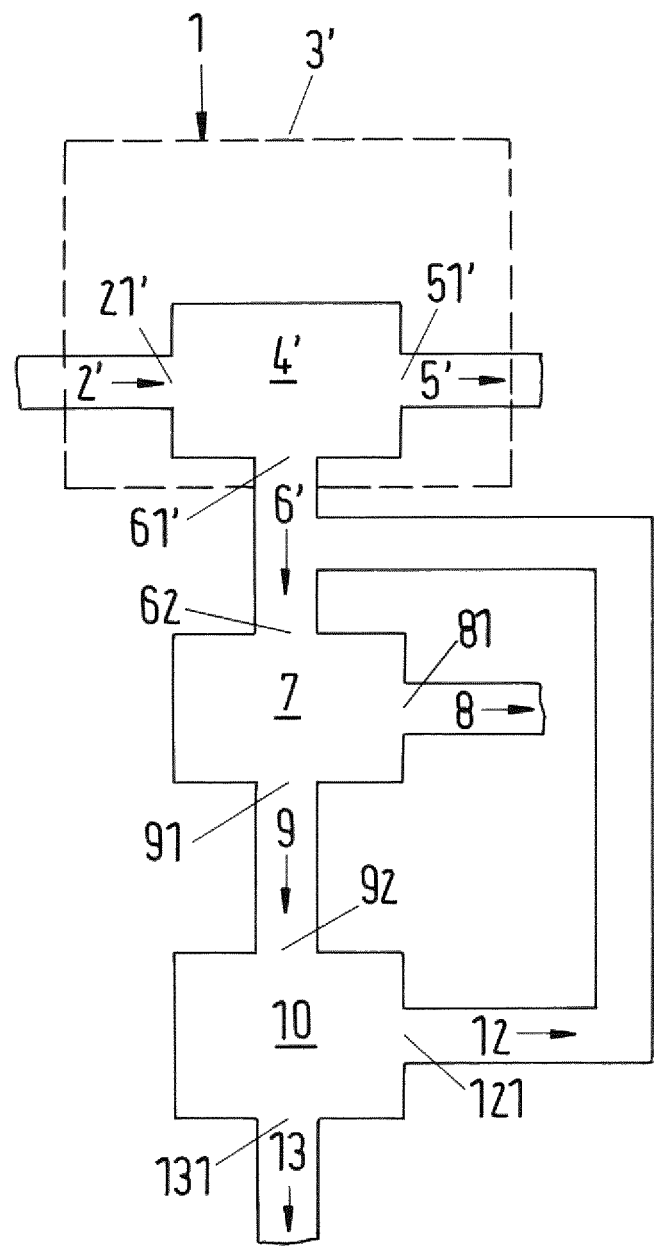
FIG. 5 shows a schematic view of a preferred embodiment of an apparatus for carrying out a process for desalinating water according to the invention, in which a third desalination step takes place in a static crystallization unit.

FIG. 5 shows a schematic view of a preferred embodiment of the invention which is an apparatus 1 as shown in FIG. 4, but wherein the apparatus 1 additionally comprises a static crystallization unit 10 having an inlet 92 in fluid communication with the outlet 91 of the falling film crystallization unit 7 and an outlet 121 for a third product water stream 12 and an outlet 131 for a third byproduct stream 13.

Figure 6:
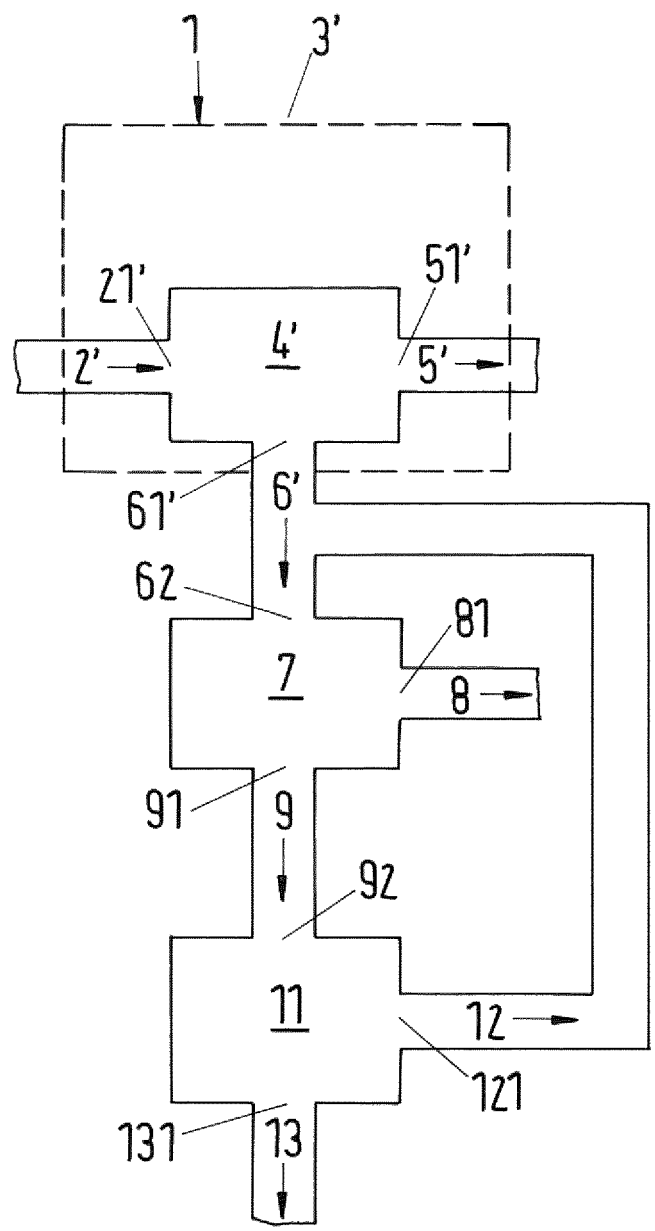
FIG. 6 shows a schematic view of a preferred embodiment of an apparatus for carrying out a process for desalinating water according to the invention, in which a third desalination step takes place in a second falling film unit.

FIG. 6 shows a schematic view of another preferred embodiment of the invention which is an apparatus 1 as shown in FIG. 4, but wherein the apparatus 1 additionally comprises a second falling film crystallization unit 11 having an inlet 92 in fluid communication with the outlet 91 of the falling film crystallization unit 7 and an outlet 121 for a third product water stream 12 and an outlet 131 for a third byproduct stream 13.

Preferred apparatus configurations for the falling film crystallization unit 7 are the same for the apparatus of the invention as shown in FIG. 4 and its preferred embodiments shown in FIG. 5 and FIG. 6 unless otherwise specifically indicated. As discussed earlier, the reverse osmosis membrane desalination plant 3', reverse osmosis desalination unit 4', inlet 21', outlet 51', and outlet 61' are all conventional and well-known in the art, for example, as disclosed in U.S. Pat. No. 4,125,463. Falling film crystallization units 7 and 11 are also well-known, for example, as disclosed in U.S. Re. 32,241 or U.S. Pat. No. 3,621,664, and they may be conventionally used and operated in the invention as described in the art unless specifically indicated otherwise. Static crystallization units 11 are also well-known, for example, as disclosed in Sulzer Technical Review February 1999 pp. 8-11, Sulzer Technical Review January 2006 pp. 4-6, or U.S. Pat. No. 6,145,340, and they too may be conventionally used and operated in the invention as described in the art unless specifically indicated otherwise.

In some specific preferred embodiments of the apparatus 1 comprising a static crystallization unit 10 or a second falling film crystallization unit 11 having an inlet 92 in fluid communication with the outlet 91 of the falling film crystallization unit 7 and an outlet 121 for a third product water stream 12 and an outlet 131 for a third byproduct stream 13, such as the embodiments shown in FIG. 5 or FIG. 6, the outlet 121 for a third product water stream 12 is in fluid communication with the first byproduct stream 6' in order to advantageously recycle the stream 12 in specific embodiments.

In preferred embodiments of the apparatus 1, the various crystallization units 7 and/or 10 and/or 11 are equipped with appropriate buffer vessel(s) and fluid connections so that additional further desalination steps may be carried out within the same unit.

Yet another aspect of the invention is the use of the process or the apparatus 1 for the reduction of the volume of the first byproduct stream 6' of a reverse osmosis (RO) membrane desalination plant 3', preferably an in-land desalination plant 3', or in a device or plant or process for producing desalinated water, for salt production, for co-production of power and desalinated water, or for air conditioning. Incorporation of the invention into a RO plant allows for a reduction of the required capacity of the RO plant and thus investment for a particular application. For example, productivity is increased by the use of the invention in that less saline solution feed is required because some of the water that would otherwise be lost is recovered. In addition these various uses typically benefit in a reduction of maintenance costs due to the use of proven crystallization units and technologies. Furthermore heat pump crystallizers may be used to reduce energy costs and minimize the equipment.

EXAMPLES

The following examples are set forth to provide those of ordinary skill in the art with a detailed description of how the processes, apparatuses and uses claimed herein are evaluated, and they are not intended to limit the scope of what the inventors regard as their invention. Unless indicated otherwise, parts are by weight, and temperature is in degrees Celsius (° C.).

The pilot plant used in the examples consisted of a single, standard falling film crystallization element (length of 12 m, diameter of 70 mm, equipped with the same type of crystallizer elements as are used for industrial crystallizers), a collecting vessel with observation window and a product circulation pump. The product section was constructed of DIN 1.4404 (ANSI 316 L).

An energy section provided the process with heat transfer medium (HTM) of the required temperature. This section consisted of an electrical heater for heating and a heat exchanger for cooling by water, which in turn was cooled by a refrigeration plant. Specific temperatures during crystallization, partial melting and total melting were maintained by a by-pass mixing system.

The pilot plant was equipped with a computer system to control, maintain and record the temperature gradients.

The pilot plant allowed the determination of crystallization behavior under conditions identical to those in a full scale falling film crystallization plant. As a result, the results obtained from this unit match those which could be expected in a full scale plant with a number of crystallization elements in parallel.

General Test Description

Pilot testing on the falling film crystallizer proceeded by the same steps or phases found in a full scale plant:

Phase 1

During phase 1 a predetermined weight of molten residue was fed to the collecting vessel and was pumped to the top of the crystallizer tube by the product circulation pump. The saline solution concentration and composition was selected to be representative of the first 6' byproduct stream coming from a typical reverse osmosis (RO) desalination unit. At the top of the tube, the product was distributed onto the inner wall of the crystallizer tube, and it flowed as a falling film back to the collecting vessel.

The HTM flowed as a co-current falling film on the outside of the crystallization tube. Over the course of the crystallization, the HTM temperature was gradually lowered. When the temperature of the product passed the solidification point, a crystal layer begins to grow on the inner tube wall. The product circulation and cooling was continued until the mother liquor reached a predetermined level in the collecting vessel.

At the end of the first phase the remaining liquid residue was drained from the collecting vessel and stored in a container.

Phase 2

In the second phase (referred to here as a sweating or partial melting phase) the temperature was increased gradually to just below the melting point of the crystal layer. Further purification of the crystal mass was carried out in this step, since trapped impurities melt and migrate to the inner surface. This partial melting results from local solid-liquid equilibrium around impurity pockets. The partially remolten product rinsed the crystal layer, thereby removing adhering residue and flushing off impurities. The partial melt fraction was collected and drained into a container and stored for reuse. The sweating phase provided a very effective additional purification of the crystal layer.

Phase 3

In the third phase the HTM temperature was set above the melting point of the crystal layer. Once enough molten product had accumulated in the collecting vessel, the circulation pump was switched on to circulate the melt and increase the speed of melting. At the end of the total melting, all product was in liquid form and could be removed from the crystallizer.

If further purification was desired, the product liquid was recrystallized in a higher stage in either the same falling film crystallization 7 or a static crystallization 10.

In the case of further purification in a static crystallizer, the pilot plant used in these examples consisted of a standard static crystallization unit of a 70 liter crystallizer, equipped with the same type of crystallizer elements as used for industrial crystallizers. It therefore avoids any risk in the design for final capacity as no scale up needs to be done. The operating phases of the static crystallization are analogous to those of the falling film process, only the product melt remains stagnant during crystallization and total melting The weights of all streams removed from the crystallizer were measured using a digital balance, and freezing point measurements were carried out where appropriate (at lower purities, where deviations from the pure product freezing point are significant enough to be detected). Samples were taken during the test runs and analyzed [residue+partial melt fractions (in certain examples (e.g. 7 or 8))+stage product].

The salt concentration (C) was determined by an electrical conductivity measurement, where the electrical conductivity (U) is expressed in units of milli-siemens per cm (mS/cm). The relationship between C in ppm and U in mS/cm is provided by the following equation:

$$C=((0.0154009*(U^3))-(2.67657*(U^2))+(922.071*(U))-(744.133))$$

The water recovery (WR) in percent (%) in the examples was determined by the following equation:

$$WR=(w_p/w_f)*100\%$$

wherein $w_p$=weight of the product and $w_f$=weight of the feed.

The salt rejection (SR) in percent (%) in the examples was determined by the following equation:

$$SR=(1-x_p/x_f)*100\%$$

wherein $x_p$=salt concentration in the product and $x_f$=salt concentration in the feed.

The yield (Y) in percent (%) in the examples was determined by the following equation:

$$Y=[x_p*(x_f-x_r)]/[x_f*(x_p-x_r)]*100\%$$

wherein $x_p$ and $x_f$ are as defined above and $x_r$=salt concentration in the residue.

The HTM temperature was varied between 15 and −24° C. The initial feed inlet temperature was 15° C., and the temperature was cooled down during the examples. The final temperature for crystallization was different for the different examples in order to observe the effect on the water recovery, the salt rejection, and the yield. The final HTM temperature during crystallization was between −6 and −24° C.

Examples 1 to 4

In these examples, a first byproduct stream 6' having a salt concentration of from 2.64 to 6.11 weight % was treated in a second desalination step 120 by crystallization in a single stage of the falling film crystallization unit 7 at temperatures of from −0.76 to −2.46° C. and yielded the results shown in Tables 1 to 4. It is noted that Examples 3 and 4 both used a sweating stage.

Figure 7:
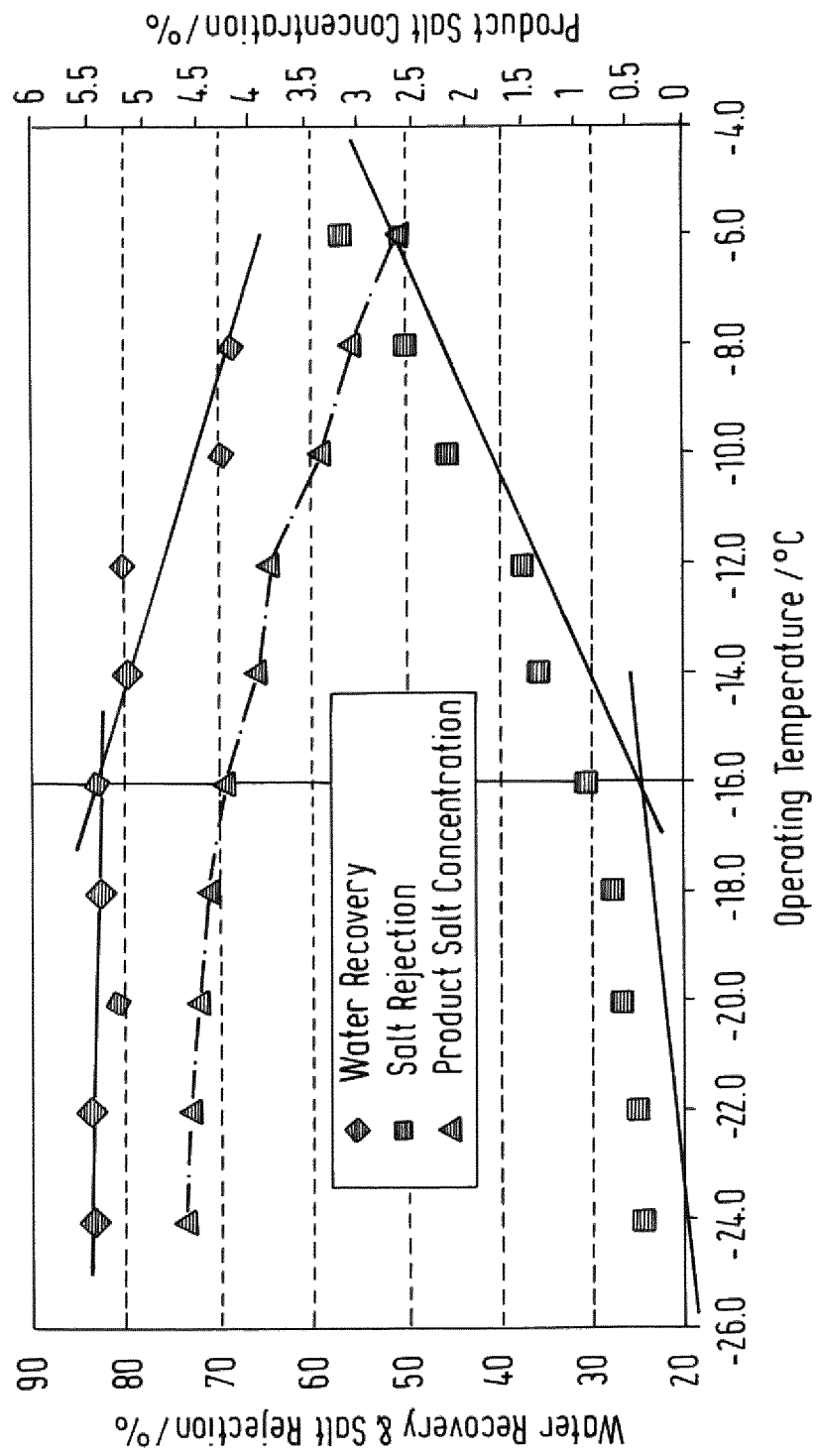
FIG. 7 shows a summary of results obtained in the Examples.

FIG. 7 summarizes the results obtained for the water recovery and salt rejection and product salt concentration obtained in a second desalination step 120 in a falling film crystallization unit 7 at a variety of operating temperatures (temperature of the heat transfer medium). It can be seen that in reducing the operating temperature an optimum is achieved at about −16° C. An operating temperature of about −16° C. results in a residue (third byproduct stream 13) having a melting point of about −9 to about −10° C., which corresponds to about 14 to about 15 weight % salt concentration, The product salt concentration is about 4 to about 5 weight %, which is quite favorable for recycling into the feed stream of saline solution 2' fed to the RO desalination plant 3'. Further reduction of the operating temperature does not result in a significant increase in the water recovery, and the salt rejection and product salt concentration properties actually decrease as the temperature is further reduced. Of course, lower operating temperatures also result in higher energy costs. Therefore an operating temperature (heat transfer medium temperature) of about −16° C. will provide an optimum trade-off for many situations.

These results demonstrate that the falling film crystallization is particularly effective in providing quite useful water recovery, salt rejection and yield results over the breadth of the preferred ranges for the salt concentration and temperature disclosed in this application. In addition, the desalination of a first byproduct stream 6' of an RO plant is particularly effective for salt concentrations between about 6 to about 7 weight % when crystallized at a temperature between about −2 to about −4° C. It is generally preferred to have the salt concentration of the first byproduct stream 6' higher in order to have a more economical use of the RO desalination unit 4'. Nonetheless one skilled in the art will understand how to appropriate trade-offs between the water recovery, salt rejection, and yield obtained for optimizing the process based on a specific situation and requirements.

Examples 5 to 6

In these examples, a second byproduct stream 9 similar to that obtained as a residue in Example 1 was further purified (third desalination step 135 or 130) by crystallization in the same falling film crystallization pilot plant (Example 5) or in a static crystallization pilot plant (Example 6). The third desalination step 135 in the falling film crystallization unit 7 was carried out with a sweating stage.

These results demonstrate that either a falling film or a static crystallization may be used in treating the second byproduct stream from a falling film crystallization unit used in a second desalination step 120. It will generally be preferred to have the salt concentration of the second byproduct stream 9 from the falling film crystallization unit 7 in the range of about 14 to about 15 weight % so that the second desalination step 120 operates most economically. However higher salt concentrations of the second byproduct stream 9 will preferably use lower crystallization temperatures in the third desalination step (130 or 135), and thus the energy costs will be increased. It is noted that the product water obtained in these examples (third product water stream 12) has a quality sufficient for it to be fed into the feed stream of the falling film crystallization unit 7 used in the second desalination step 120.

Examples 7 to 8

In these examples, the beneficial effect of including a sweating stage is demonstrated in Example 7 for the case of a second desalination step 120 in a falling film crystallization unit 7 and in Example 8 for the case of a third desalination step 130 in a static crystallization unit 10. The incorporation of a sweating stage results in a higher product purity and higher salt rejection; however, the water recovery and yield are somewhat reduced and larger equipment and a longer processing time is required. One skilled in the art will understand how to make trade-offs in these particular aspects in order to obtain an optimized result for a particular situation and requirements.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

TABLE 1

| | | Example 1 | | |
|---|---|---|---|---|
| Parameter | Units | 1st byproduct stream 6' | 2nd product water stream 8 | 2nd byproduct stream 9 |
| Mass Percent | (%) | 6.11 | 4.45 | 14.78 |
| Melting Point | (° C.) | −3.24 | −2.46 | −9.66 |
| Water Recovery | (%) | 84.17 | | |
| Salt Rejection | (%) | 27.15 | | |
| Yield | (%) | 85.43 | | |

TABLE 2

| | | Example 2 | | |
|---|---|---|---|---|
| Parameter | Units | 1st byproduct stream 6' | 2nd product water stream 8 | 2nd byproduct stream 9 |
| Mass Percent | (%) | 4.45 | 3.25 | 9.53 |
| Melting Point | (° C.) | −2.46 | −1.88 | −5.20 |
| Water Recovery | (%) | 81.86 | | |
| Salt Rejection | (%) | 27.10 | | |
| Yield | (%) | 81.82 | | |

TABLE 3

Example 3

| Parameter | Units | 1st byproduct stream 6' | 2nd product water stream 8 | 2nd byproduct stream 9 |
|---|---|---|---|---|
| Mass Percent | (%) | 3.37 | 1.79 | 9.79 |
| Melting Point | (° C.) | −1.94 | −1.10 | −5.38 |
| Water Recovery | (%) | 71.79 | | |
| Salt Rejection | (%) | 46.85 | | |
| Yield | (%) | 81.57 | | |

TABLE 4

Example 4

| Parameter | Units | 1st byproduct stream 6' | 2nd product water stream 8 | 2nd byproduct stream 9 |
|---|---|---|---|---|
| Mass Percent | (%) | 2.64 | 1.23 | 6.28 |
| Melting Point | (° C.) | −1.57 | −0.76 | −3.32 |
| Water Recovery | (%) | 63.48 | | |
| Salt Rejection | (%) | 53.53 | | |
| Yield | (%) | 73.04 | | |

TABLE 5

Example 5

| Parameter | Units | 2nd byproduct stream 9 | 3rd product water stream 12 | 3rd byproduct stream 13 |
|---|---|---|---|---|
| Mass Percent | (%) | 14.20 | 11.38 | 21.75 |
| Melting Point | (° C.) | −9.09 | −6.58 | −17.51 |
| Water Recovery | (%) | 69.72 | | |
| Salt Rejection | (%) | 19.85 | | |
| Yield | (%) | 75.21 | | |

TABLE 6

Example 6

| Parameter | Units | 2nd byproduct stream 9 | 3rd product water stream 12 | 3rd byproduct stream 13 |
|---|---|---|---|---|
| Mass % | (%) | 14.78 | 5.94 | 22.80 |
| Melt. Point | (° C.) | −9.66 | −3.16 | −18.82 |
| Water Recovery | (%) | 41.91 | | |
| Salt Rejection | (%) | 59.83 | | |
| Yield | (%) | 46.67 | | |

TABLE 7

Example 7

| Parameter | Units | Feed | Prod. | Residue | Fract. 1 | Fract. 2 | Fract. 3 | Fract. 4 |
|---|---|---|---|---|---|---|---|---|
| Mass Percent | (%) | 6.05 | 3.37 | 14.54 | 13.04 | 9.35 | 7.80 | 6.44 |
| Melting Point | (° C.) | −3.21 | −1.94 | −9.42 | −8.00 | −5.08 | −4.12 | −3.40 |
| Water Recovery | (%) | 69.85 | | | | | | |
| Salt Rejection | (%) | 44.28 | | | | | | |
| Yield | (%) | 78.19 | | | | | | |

TABLE 8

Example 8

| Parameters | Units | Feed | Before Sweating Product | After Sweating Product | After Sweating Residue |
|---|---|---|---|---|---|
| Mass Percent | (%) | 13.00 | 10.19 | 5.25 | 20.89 |
| Melting Point | (° C.) | −7.97 | −5.67 | −2.83 | −16.47 |
| Water Recovery | (%) | | 77.29 | 49.84 | |
| Salt Rejection | (%) | | 21.63 | 61.10 | |
| Yield | (%) | | 87.13 | 60.59 | |

The invention claimed is:

1. A process for desalinating water comprising the steps of:
   passing a feed stream of saline solution in a first desalination step through a reverse osmosis membrane desalination plant comprising at least one reverse osmosis desalination unit to form a first product water stream having a reduced salt concentration relative to that of the feed stream of saline solution and a first byproduct stream having an increased salt concentration relative to that of the feed stream of saline solution,
   wherein the first byproduct stream is passed in a second desalination step through a first falling film crystallization unit to form a second product water stream having a reduced salt concentration relative to that of the first byproduct stream and a second byproduct stream having an increased salt concentration relative to that of the first byproduct stream,
   wherein the salt concentration of the first byproduct stream is between 3 to 7 weight %,
   wherein the second byproduct stream is passed in a third desalination step through a static crystallization unit to form a third product water stream having a reduced salt concentration relative to that of the second byproduct stream and a third byproduct stream having an increased salt concentration relative to that of the second byproduct stream,
   wherein the third product water stream is fed into the first byproduct stream, and
   wherein the second byproduct stream is crystallized in the static crystallization unit at a temperature between about −4 to about −13° C.

2. The process of claim 1, wherein the first byproduct stream is crystallized in the first falling film crystallization unit at a temperature between about −1 to about −4° C.

3. The process of claim 1, wherein the salt concentration of the second byproduct stream is between about 8 to about 18 weight %.

4. The process of claim 1, wherein the second desalination step in the first falling film crystallization unit and/or the third desalination step in the static crystallization unit or the first falling film crystallization unit or the second falling film crystallization unit comprises a sweating stage in which a byproduct is removed from a product by means of partial melting of a crystal within the first falling film crystallization unit or the static crystallization unit or the second falling film crystallization unit.

5. The process of claim 1, wherein the steps occur in a reverse osmosis membrane desalination plant, or in a device or plant or process for producing desalinated water, for salt production, for co-production of power and desalinated water, or for air conditioning.

6. An apparatus for carrying out a process for desalinating water, the apparatus comprising:
- a reverse osmosis membrane desalination plant comprising at least one reverse osmosis desalination unit having an inlet for a feed stream of saline solution, an outlet for a first product water stream, an outlet for a first byproduct stream,
- wherein the outlet for a first byproduct stream is in fluid communication with an inlet of a first falling film crystallization unit having an outlet for a second product water stream, and an outlet for a second byproduct stream,
- wherein the outlet for the second byproduct stream is in fluid communication with an inlet of a static crystallization unit having an outlet for a third product water stream and an outlet for a third byproduct stream,
- wherein the third product water stream is in fluid communication with the first byproduct stream.

7. The apparatus of claim 6, wherein, in use, the feed stream of saline solution in a first desalination step is passed through the reverse osmosis membrane desalination plant to form the first product water stream having a reduced salt concentration relative to that of the feed stream of saline solution and the first byproduct stream having an increased salt concentration relative to that of the feed stream of saline solution,
- wherein, in use, the first byproduct stream is passed in a second desalination step through the first falling film crystallization unit to form the second product water stream having a reduced salt concentration relative to that of the first byproduct stream and the second byproduct stream having an increased salt concentration relative to that of the first byproduct stream.

8. The apparatus of claim 6, wherein the reverse osmosis membrane desalination plant is an in-land desalination plant.

9. The apparatus of claim 8, where the plant produces desalinated water, salt power, conditioned air, or any combination thereof.

* * * * *